United States Patent [19]

Sagaser et al.

[11] 4,117,899
[45] Oct. 3, 1978

[54] HYDRAULIC SYSTEM FOR A SKID-STEER LOADER

[75] Inventors: Thomas M. Sagaser, Gwinner; Joseph M. Mather, Lisbon, both of N. Dak.

[73] Assignee: Clark Equipment Company, Buchanan, Mich.

[21] Appl. No.: 767,265

[22] Filed: Feb. 10, 1977

[51] Int. Cl.² ............................................. B62D 11/04
[52] U.S. Cl. ..................................... 180/6.48; 60/453; 180/66 R
[58] Field of Search .............. 180/6.48, 66 R; 60/468, 60/456, 453

[56] References Cited

U.S. PATENT DOCUMENTS

| | | | |
|---|---|---|---|
| 3,635,365 | 1/1972 | Bauer | 180/6.48 |
| 3,896,618 | 7/1975 | Smith | 60/456 |
| 3,903,978 | 9/1975 | Kraus | 180/6.48 |
| 3,918,546 | 11/1975 | Chichester | 180/66 R |

*Primary Examiner*—Joseph F. Peters, Jr.
*Assistant Examiner*—Donn McGiehan
*Attorney, Agent, or Firm*—Ernst H. Ruf

[57] ABSTRACT

Provided in the hydraulic system for a skid-steer loader is a porting block controlling flow of hydraulic fluid to the driving portion of the hydraulic system. The porting block directs fluid flow to the hydrostatic pumps actuating hydrostatic drivng motors associated with the drive mechanism of a skid-steer loader. Provided within the porting block is a filter for hydraulic fluid as well as a "cold weather" by-pass for hydraulic fluid.

2 Claims, 5 Drawing Figures

HYDRAULIC SYSTEM FOR A SKID-STEER LOADER

BACKGROUND OF THE INVENTION

A skid-steer loader, having independently driven sets of wheels on opposite sides of the vehicle as well as a boom assembly carrying work attachments thereon for use with the vehicle requires an effective, compact, efficient hydraulic system for controlling the independent hydrostatic drives for each set of wheels as well as the hydraulic operation of the boom and its attachments. The drive mechanism for the wheels includes a pair of axially aligned hydrostatic pumps, each pump carrying hydrostatic fluid to a hydrostatic motor connected to a chain and sprocket drive for its respective set of wheels on opposite sides of the vehicle. The hydrostatic drive mechanism is interconnected with the hydraulic system controlling the lift and tilt cylinders of the boom assembly of the skid-steer vehicle. A vane pump, axially aligned with the hydrostatic pump, operates to circulate hydraulic fluid to the valve bank controlling the lift and tilt cylinders.

In the prior art, various fittings were interposed between the vane pump and the valve bank to direct fluid from an oil reservoir to the hydrostatic pumps controlling the hydrostatic drive as well as to the valve bank and to the vane pump. In addition, various filters were provided in the hydraulic system to clean and recirculate hydraulic fluid throughout.

In the present invention, a porting block is mounted on the vane pump to control the flow of hydraulic fluid from the valve bank controlling the boom assembly as well as controlling the flow of hydraulic fluid to the inlet side of the hydrostatic motors controlling the hydrostatic drive of the vehicle. In addition, the valve bank is provided with a filter to clean hydraulic fluid as well as a by-pass filter to control the flow of hydraulic fluid. The port block simplifies the hydraulic system of the skid-steer vehicle, eliminates various fittings associated with the control of hydraulic fluid flowing through the system and provides a more compact, efficient hydraulic system for the vehicle.

Other objects and advantages of the present system will become apparent upon a reading of the specification, particularly when considered with the drawings provided in conjunction therewith.

PREFERRED EMBODIMENT

Figure 1:
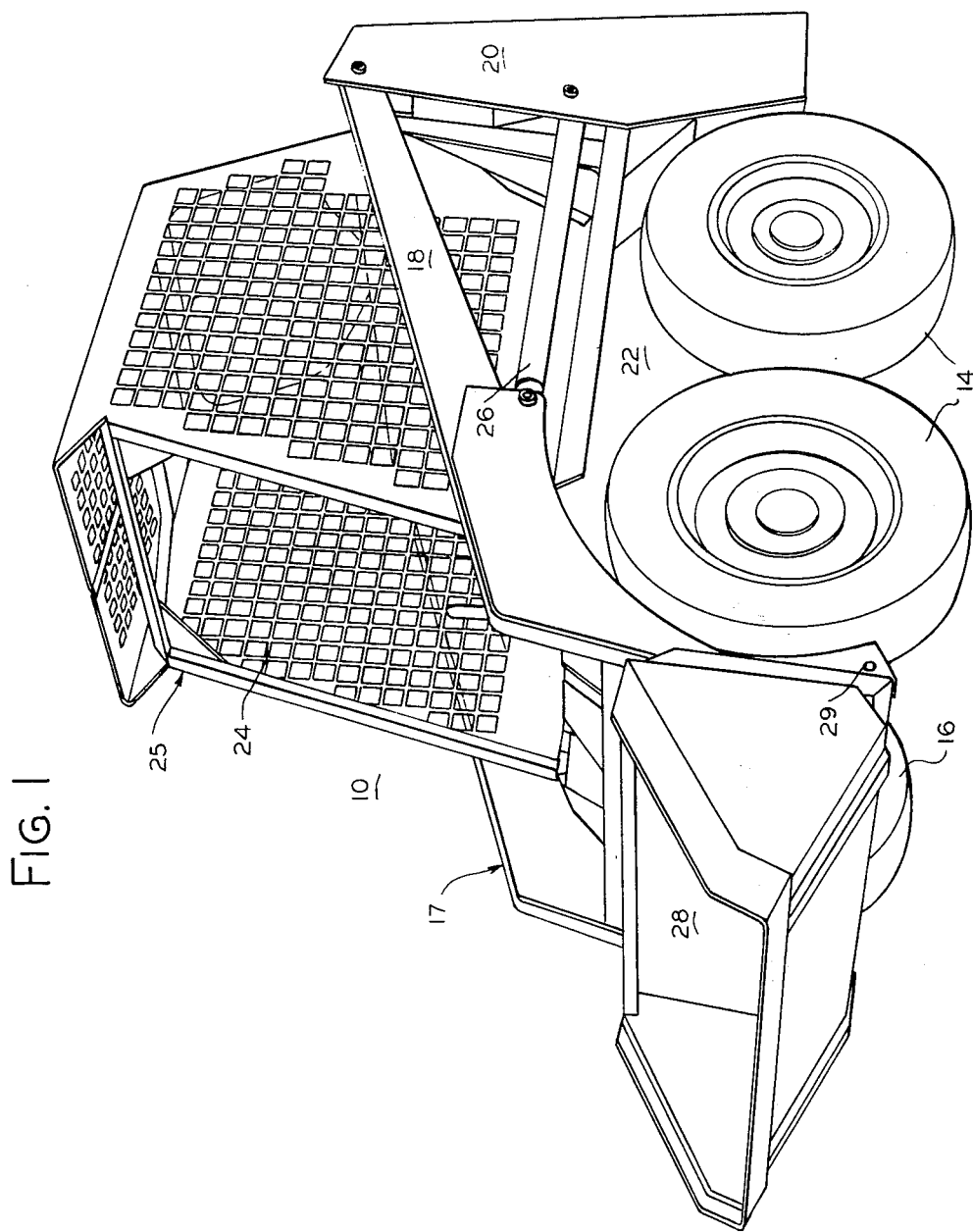
FIG. 1 is a front quarter perspective view of a skid-steer vehicle employing the hydraulic system of the present invention.
Figure 2:
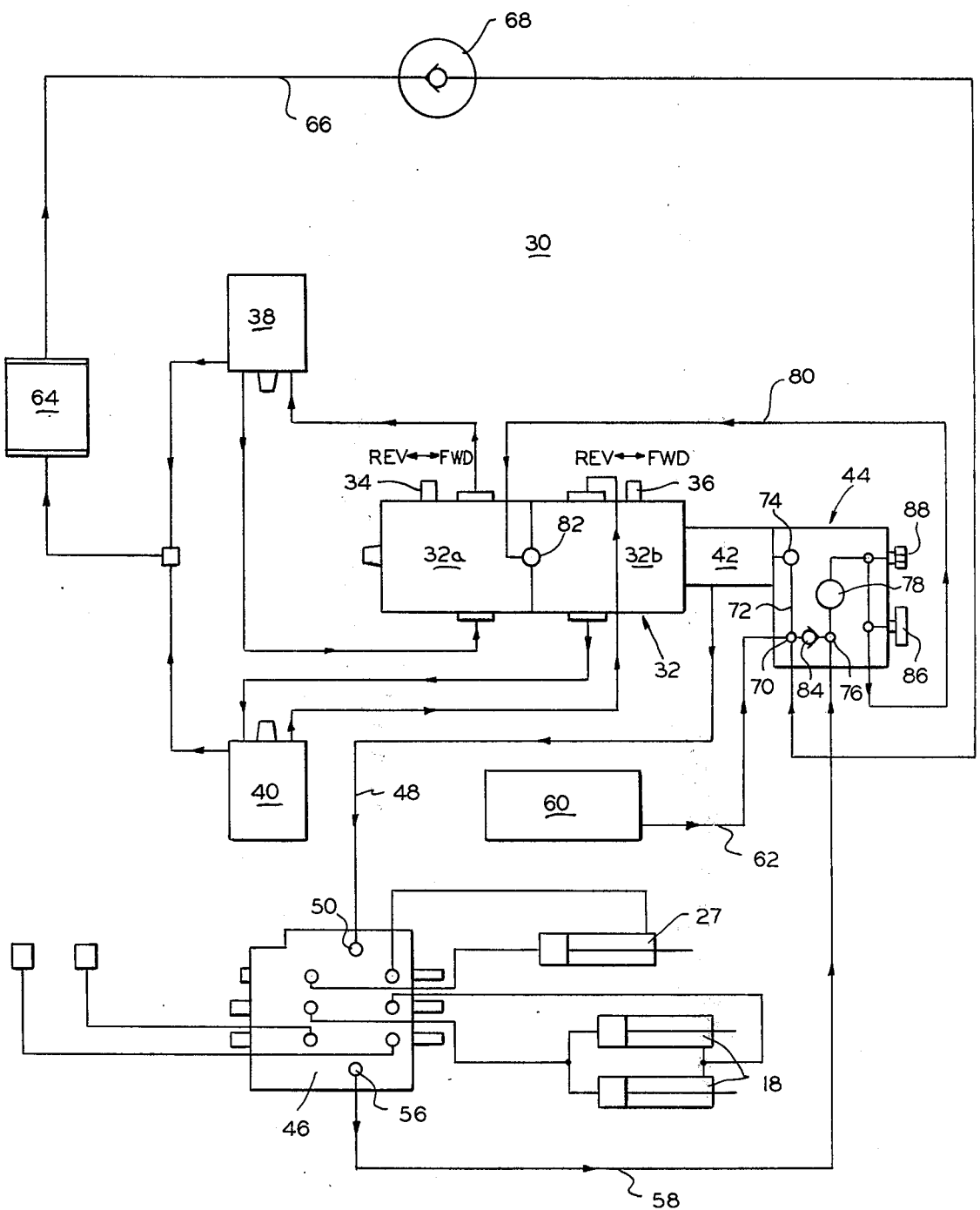
FIG. 2 is a schematic of the hydraulic system of the present invention.

Referring to FIG. 1, the reference numeral 10 denotes generally a compact, four-wheel drive skid-steered vehicle having a pair of drive wheels 14 on one side and a pair of drive wheels 16 on the other side. The vehicle 10 is equipped with a boom assembly 17 having a pair of boom arms 18 pivotally mounted to respective uprights 20 provided at the rear of a tractor body portion 22 of the vehicle 10. The boom arms 18 extend forwardly along an operator's compartment 24 enclosed by a protective enclosure 25. The boom arms 18 are raised and lowered by lift cylinders 26 pivotally connected at one end to the upright 20 and at an opposite end to a forward portion of the boom arm 18. The boom assembly 17 has mounted at a forward end portion an attachment carrier (not shown) pivoted by a tilt cylinder 27 (FIG. 2). The attachment carrier has mounted thereon a bucket 28. The bucket 28 is pivotally connected to the boom assembly 17 at respective lower front ends of the boom arms 18 at respective pivotal connections 29.

Considering now the hydraulic system 30 shown in FIG. 2 of the drawings, a vehicle drive pump 32 comprises a pair of axially aligned variable displacement hydrostatic pumps 32a and 32b. The pumps 32a and 32b are controlled as to direction of flow of hydraulic fluid by respective operating controls 34 and 36. The pump 32a controls a hydrostatic motor 38 connected to the chain and sprocket drive (not shown) interposed between a pair of wheels 16 provided on one side of the skid-steer vehicle 10. Hydrostatic motor 40 controlling the wheels 14 on the opposite side of the vehicle 10, is controlled by hydrostatic pump 32b. A hydraulic vane pump 42, axially aligned with the hydrostatic pumps 32a and 32b, receives fluid drained internally from the pumps 32a and 32b. Hydraulic pump 42 provides hydraulic pressure both for charging drive pumps 32a and 32b, as well as for powering lift cylinders 18 and tilt cylinder 27. Mounted on the vane pump 42 is a port block 44, which provides for the flow of hydraulic fluid through the system as will be described hereinafter.

In addition to the port block 44 the hydraulic system 30 includes a valve bank 46 supplied with fluid from the vane pump 42 by conduit 48, the fluid flowing from the pump 42 through the conduit 48 to an inlet 50 of the valve bank 46. The valve bank 46 controls the lift cylinders 18 for the boom assembly as well as the tilt cylinder 27 which controls the bucket 28 mounted at the end of the boom assembly. A fluid outlet 56 of the valve bank 46 carries fluid from the valve bank through a conduit 58 to the port block 44 of the hydraulic system 30. A hydraulic reservoir 60 also carries fluid to the port block 44 through a conduit 62.

Further provided in the hydraulic system 30 is an oil cooler 64 interposed between the outlets of the hydrostatic motors 38 and 40 and the port block 44. A hydraulic line 66 carries the fluid from the oil cooler 64 to the port block 44. Provided in the hydraulic line 66 is a filter 68.

The porting block 44 is a multi-purpose block and controls the flow of hydraulic fluid as follows. Fluid flow from the reservoir 60 through the conduit 62 enters the porting block 44 at inlet 70 to flow through an interior passage 72 to an outlet 74 flowing to the vane pump 42. Fluid flow from the motors 38 and 40 flow through the oil cooler 64 and pass to the porting block 44 via the conduit 66 after flowing through the filter 68 to enter the porting block 44 at the inlet 70. Fluid flowing from the outlet port 56 of the valve bank 46 enters the port block 44 at inlet 76 via the conduit 58.

The fluid flow from the valve bank 46 may traverse alternate paths. Fluid can flow through a filter 78 provided in the block 44, through a conduit 80 to the charge pump inlet 82 of the dual hydrostatic pumps 32a and 32b. If the filter 78 becomes plugged the fluid entering the port block 44 through the inlet 76 can flow through a by-pass valve 84 to the inlet 74 of the vane pump 42. In this event a pressure switch 86 on the low pressure side of the filter 78 will alert the vehicle operator that he is no longer maintaining the charge pressure required for the drive pumps 32a and 32b. Cold fluid will have a partial flow through the filter 78 and a partial flow through the by-pass valve 84. The by-pass valve 84 may be set to open at a predetermined pressure level to insure that the charge pressure for the hydrostatic pumps 32a and 32b does not exceed optimum operating levels. Also provided on the port block 44 is a temperature switch 88 for measuring temperature levels of the fluid flowing into the charge inlet 82 of the variable displacement pumps 32a and 32b.

Figure 3:
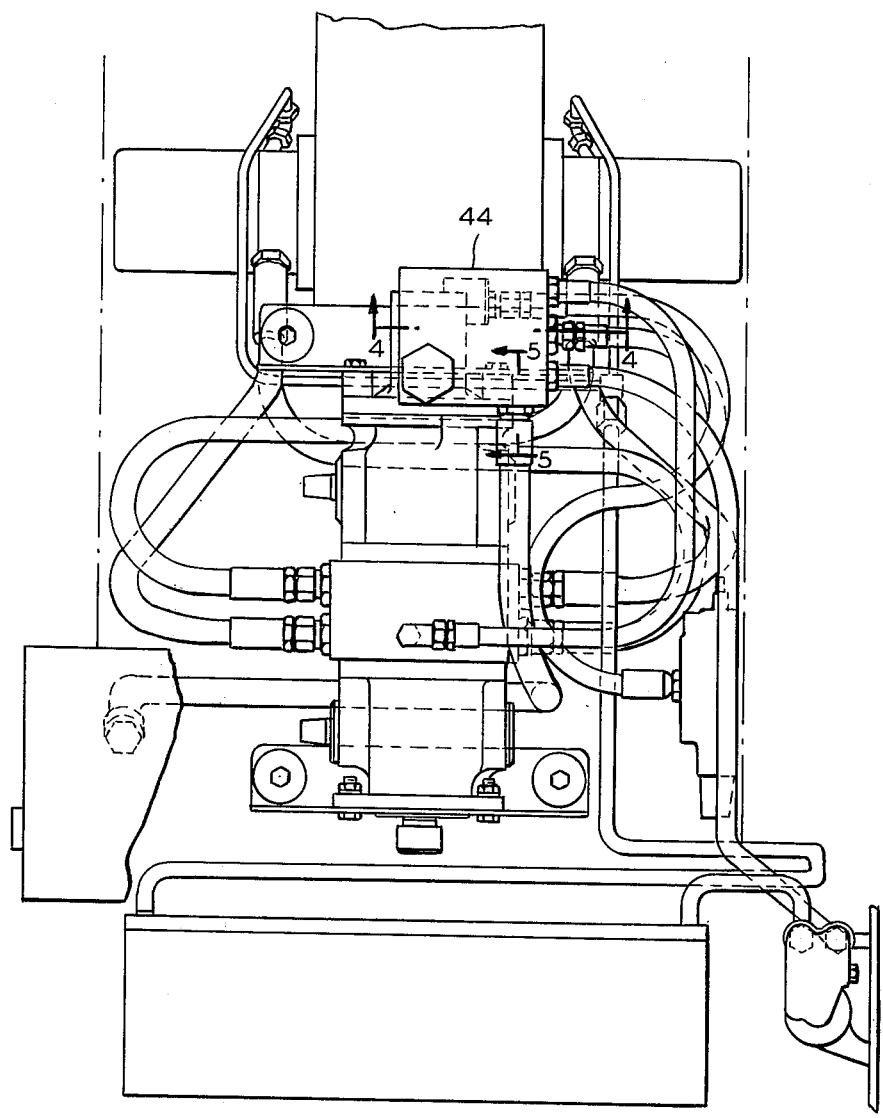
FIG. 3 is an end view of a portion of the hydraulic system as it is mounted on the vehicle, the figure showing the porting block of the present invention.
Figure 5:
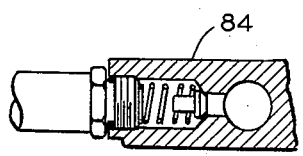
FIG. 5 is a view taken along the lines 5—5 of FIG. 3.
Figure 4:
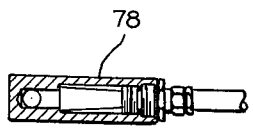
FIG. 4 is a view taken along the lines 4—4 of FIG. 3.

FIGS. 3, 4 and 5 show the physical arrangement of the hydraulic system with the porting block 44 mounted on an upper portion of the skid-steer vehicle 10 at a rear end thereof between the uprights 20 with FIGS. 4 and 5 showing respective sectional views of the filter 78 and the by-pass valve 84. It is believed that the porting block of the present invention provides a compact, efficient method of controlling hydraulic flow throughout the hydraulic system providing for operation of the skid-steer mechanism as well as control of the hydraulic cylinders associated with the vehicle. The proposed porting block eliminates external fittings, simplifies the hydraulic system and provides for a more compact and efficient hydraulic system for the vehicle.

Having disclosed an improved hydraulic system for skid-steer vehicles, and in particular an improved porting block for that system, it should be understood that the detailed description of the invention is intended to be illustrative only and that various modifications and changes may be made in the invention without departing from the scope of it. Therefore, the limits of the invention should be determined from the attached claims.

We claim:

1. An improved port block for the hydraulic system of a skid-steer vehicle, the block including a first outlet port for carrying fluid to a hydraulic control pump of the system, a first inlet port for receiving fluid directed from a hydraulic reservoir provided in the system, a second inlet port for receiving fluid directed from an implement operating means provided in the system, a second outlet port for directing fluid to an inlet port of a pair of hydrostatic drive pumps provided in the system, fluid passages provided in the port block and disposed between said inlet and outlet ports, fluid filtering means provided in a passage of the porting block, by-pass means provided in a passage of the porting block for directing the flow of fluid to the hydraulic pump in the event of the clogging of said filtering means and means for sensing fluid temperature and pressure conditions in the hydraulic system.

2. An improved hydraulic system for controlling the drive means and the implement operating means of a skid-steer vehicle, the system comprising a pair of axially aligned hydrostatic drive pumps operatively connected to the drive means for the skid-steer vehicle, the drive means comprising a pair of hydrostatic motors operatively connected to respective drive mechanisms for independently driving each set of wheels provided on opposite sides of the skid-steer vehicle, and means including a hydraulic pump for directing flow from the hydraulic pumps to implement operating means of the vehicle, the improvement comprising a port block mounted on the hydraulic pump and interconnected with the hydraulic pump and the implement operating means to control the flow of hydraulic fluid through the system, said port block having an outlet port carrying fluid to the inlet of the hydraulic pump of the hydraulic system, a fluid inlet port carrying fluid from a hydraulic reservoir provided in the system to the hydraulic of the system and fluid inlet means carrying fluid from the implement operating means to the drive pumps pump, via the port block including a filter for hydraulic fluid, a by-pass valve for recirculating fluid from the implement operating means to the hydraulic pump in the event of the clogging of said filter, a pressure switch to measure the output pressure of fluid directed to the drive pumps, and a temperature switch for measuring the temperature of circulating hydraulic fluid.

* * * * *